United States Patent
Chen et al.

(10) Patent No.: US 11,368,321 B2
(45) Date of Patent: Jun. 21, 2022

(54) POWER SOURCING EQUIPMENT AND ENERGY SAVING METHOD FOR POWER OVER ETHERNET

(71) Applicant: HUAWEI TECHNOLOGIES CO., LTD., Guangdong (CN)

(72) Inventors: Hua Chen, Nanjing (CN); Shiyong Fu, Nanjing (CN); Yan Zhuang, Nanjing (CN); Rui Hua, Suzhou (CN); Qi Dong, Nanjing (CN); Chao Gu, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/802,974

(22) Filed: Feb. 27, 2020

(65) Prior Publication Data
US 2020/0195451 A1   Jun. 18, 2020

Related U.S. Application Data

(63) Continuation of application No. PCT/CN2018/076740, filed on Feb. 13, 2018.

(30) Foreign Application Priority Data

Aug. 28, 2017   (CN) .................. 201710750171.X

(51) Int. Cl.
*G06F 1/32*      (2019.01)
*H04L 12/10*    (2006.01)
(Continued)

(52) U.S. Cl.
CPC ............ *H04L 12/10* (2013.01); *G06F 1/3203* (2013.01); *G06F 1/3209* (2013.01)

(58) Field of Classification Search
None
See application file for complete search history.

(56) References Cited

U.S. PATENT DOCUMENTS 9,405,341 B2 *   8/2016   Kao .......................... G06F 1/26
9,515,507 B2 * 12/2016   Ruef ..................... H02J 7/0068
(Continued)

FOREIGN PATENT DOCUMENTS

CA   2940788 A1   5/2017
CN   102387022 A   3/2012
(Continued)

OTHER PUBLICATIONS

China Internet Association "China Mobile Internet Development Status and Security Report (2017)",May 18, 2017 ,total 15 pages.

*Primary Examiner* — Fahmida Rahman
(74) *Attorney, Agent, or Firm* — Womble Bond Dickinson (US) LLP

(57) ABSTRACT

Power sourcing equipment (PSE) and an energy saving method for Power over Ethernet are provided. The PSE includes: a low-power detection component, configured to: detect a power supply port when being connected to the power supply port; and send a first instruction when the power supply port is connected to a valid powered device PD, to instruct a control switch to connect a PSE chip and the power supply port and disconnect the low-power detection component from the power supply port, and instruct a power switch to connect the PSE chip and a power supply; the control switch, configured to: according to the first instruction, connect the PSE chip and the power supply port, and disconnect the low-power detection component from the power supply port; and the power switch, configured to connect the PSE chip to the power supply port according to the first instruction.

16 Claims, 2 Drawing Sheets

(51) Int. Cl.
    *G06F 1/3209*    (2019.01)
    *G06F 1/3203*    (2019.01)

(56)            References Cited

U.S. PATENT DOCUMENTS

| | | |
|---|---|---|
| 2007/0165548 A1 | 7/2007 | Woo et al. |
| 2009/0210725 A1 | 8/2009 | Kim et al. |
| 2010/0023785 A1 | 1/2010 | Diab |
| 2013/0103958 A1 | 4/2013 | Hua et al. |
| 2015/0215131 A1 | 7/2015 | Paul et al. |
| 2015/0244535 A1* | 8/2015 | Chen ................. H04L 12/40045 713/300 |
| 2016/0127135 A1* | 5/2016 | Balasubramanian ........................ H04L 12/40045 713/300 |

FOREIGN PATENT DOCUMENTS

| | | |
|---|---|---|
| CN | 102404125 A | 4/2012 |
| CN | 102970146 A | 3/2013 |
| CN | 103490906 A | 1/2014 |
| CN | 104901813 A | 9/2015 |
| CN | 104954146 A | 9/2015 |
| CN | 105871559 A | 8/2016 |
| CN | 106253357 A | 12/2016 |
| CN | 106487522 A | 3/2017 |

* cited by examiner

POWER SOURCING EQUIPMENT AND ENERGY SAVING METHOD FOR POWER OVER ETHERNET

CROSS-REFERENCE TO RELATED APPLICATIONS

This application is a continuation of International Application No. PCT/CN2018/076740, filed on Feb. 13, 2018, which claims priority to Chinese Patent Application No. 201710750171.X, filed on Aug. 28, 2017. The disclosures of the aforementioned applications are hereby incorporated by reference in their entireties.

TECHNICAL FIELD

The present invention relates to the communications field, and in particular, to power sourcing equipment and an energy saving method for Power over Ethernet.

BACKGROUND

Power over Ethernet (PoE) includes power sourcing equipment (PSE) and a powered device (PD). The PoE is a wired power over Ethernet technology. The PoE allows data and power to be coupled and transmitted to the powered device through a network cable, or may allow data and power to be separated and transmitted to the powered device through a network cable.

In 2003, the Institute of Electrical and Electronic Engineers (IEEE) released the PoE standard IEEE 802.3af, and the PSE can provide the PD with 15.4 W power. In 2009, the high-power PoE standard IEEE 802.3at was released, and the PSE can provide the PD with 30 W power. Currently, the PoE standard is still evolving, and is to cover a 90 W power range.

As a growing quantity of PoE devices are popularized and applied, a power loss of the PD is increasingly concerned.

SUMMARY

This application provides power sourcing equipment and an energy saving method for Power over Ethernet, to reduce a power loss of the power sourcing equipment and avoid a resource waste.

According to a first aspect, power sourcing equipment is provided, the power sourcing equipment includes a power supply port, a power sourcing equipment PSE chip, a low-power detection component, a control switch, and a power switch; and the power supply port is connected to the control switch, the PSE chip and the low-power detection component are separately connected to the control switch, and the PSE chip is connected to the power switch;

the low-power detection component is configured to: detect the power supply port when being connected to the power supply port; and send a first instruction when the power supply port is connected to a valid PD, where the first instruction is used to instruct the control switch to connect the PSE chip and the power supply port and disconnect the low-power detection component from the power supply port, and instruct the power switch to connect the PSE chip and a power supply;

the control switch is configured to: according to the first instruction, connect the PSE chip and the power supply port, and disconnect the low-power detection component from the power supply port; and the power switch is configured to connect the PSE chip to the power supply according to the first instruction.

In the foregoing technical solution, when the low-power detection component detects that the power supply port is connected to a valid PD, the PSE chip is connected to the power supply port, and the low-power detection component is disconnected from the power supply port, and the power switch is instructed to connect the PSE chip and the power supply. In this way, the power supply of the PSE chip is not always connected, so that a power loss can be reduced and a resource waste can be avoided.

In one embodiment, when the PSE chip is connected to the power supply port, and the PSE chip is connected to the power supply, the PSE chip is configured to send a status notification to the low-power detection component when detecting that the power supply port is in a non-power supplied state, where the status notification is used to instruct the low-power detection component to send a second instruction, and the second instruction is used to instruct the control switch to disconnect the PSE chip from the power supply port and connect the low-power detection component and the power supply port, and instruct the power switch to disconnect the PSE chip from the power supply;

the control switch is further configured to: according to the second instruction, disconnect the PSE chip from the power supply port, and connect the low-power detection component and the power supply port; and the power switch is further configured to disconnect the PSE chip from the power supply according to the second instruction.

In the foregoing technical solution, when the power supply port is in the non-power supplied state, it indicates that no power needs to be supplied to the PSE chip. The PSE chip can be disconnected from the power supply to reduce a power loss.

In one embodiment, when the PSE chip is connected to the power supply port, and the PSE chip is connected to the power supply, the PSE chip is specifically configured to detect the power supply port, and output a normal supply voltage when a detection result of the power supply port is that the power supply port is connected to a valid PD.

In the foregoing technical solution, to reduce a power loss, the normal supply voltage is output only when the detection result of the power supply port is that the power supply port is connected to a valid PD.

In one embodiment, when the PSE chip is connected to the power supply port, and the PSE chip is connected to the power supply, the PSE chip is specifically configured to directly output a normal supply voltage through the power supply port.

In the foregoing technical solution, the PSE chip can directly output a normal supply voltage through the power supply port to supply power to the PD in a timely manner.

In one embodiment, an operating voltage of the low-power detection component is greater than or equal to 10 volts.

In the foregoing technical solution, to detect that the power supply port is connected to the valid PD, the operating voltage of the low-power detection component needs to be greater than or equal to 10 volts.

In one embodiment, the low-power detection component is located in the PSE chip of the power sourcing equipment.

In the foregoing technical solution, the low-power detection component is located in the PSE chip, so that the PSE chip is highly integrated. This avoids external interference.

According to a second aspect, an energy saving method for Power over Ethernet is provided, and the method is applied to power sourcing equipment that includes a power supply port, a low-power detection component, and a power sourcing equipment PSE chip, and includes:

detecting, by the low-power detection component, whether the power supply port is connected to a valid powered device PD, where the power supply port is connected to the low-power detection component, the power supply port is disconnected from the PSE chip, and the PSE chip is disconnected from a power supply; and when the power supply port is detected as being connected to a valid PD, connecting the PSE chip and the power supply port, disconnecting the low-power detection component from the power supply port, and connecting the PSE chip and the power supply.

According to the energy saving method for Power over Ethernet provided in this application, the PSE chip is disconnected from the power supply, the low-power detection component operating at a low voltage detects whether the power supply port is connected to a valid PD, and after the power supply port is detected as being connected to a valid PD, the PSE chip is connected to the power supply. This can prevent the power supply from continuously outputting power before the power sourcing equipment is connected to the valid PD, thereby reducing power consumption of the power sourcing equipment.

In one embodiment, the method further includes:

when the power supply port is not connected to a valid PD, keeping the power supply port connected to the low-power detection component, the power supply port disconnected from the PSE chip, and the PSE chip disconnected from the power supply, and continuing, by the low-power detection component, to detect the power supply port.

In one embodiment, after the connecting the PSE chip and the power supply port, disconnecting the low-power detection component from the power supply port, and connecting the PSE chip and the power supply, the method further includes:

if the PSE chip detects that the PD connected to the power supply port is in a non-power supplied state, disconnecting the PSE chip from the power supply, disconnecting the PSE chip from the power supply port, and connecting the low-power detection component and the power supply port, so that the low-power detection component detects the power supply port.

In one embodiment, after the connecting the PSE chip and the power supply port, disconnecting the low-power detection component from the power supply port, and connecting the PSE chip and the power supply, the method further includes:

detecting, by the PSE chip, the power supply port, and outputting a normal supply voltage when a detection result of the power supply port is that the power supply port is connected to a valid PD; or directly outputting, by the PSE chip, the normal supply voltage through the power supply port.

According to a third aspect, a computer readable storage medium is provided. The computer readable storage medium stores an instruction. When running on a computer, the instruction enables the computer to perform the method according to the second aspect.

According to a fourth aspect, a computer program product that includes an instruction is provided. When running on a computer, the computer program product enables the computer to perform the methods according to the foregoing aspects.

According to a fifth aspect, a power supply system is provided and includes a powered device and the power sourcing equipment according to the first aspect.

DESCRIPTION OF EMBODIMENTS

In the embodiments of the present invention, when a power supply port is detected as being connected to a valid PD, a PSE chip is connected to the power supply port, a low-power detection component is disconnected from the power supply port, and a power supply of the PSE chip is connected. The power supply of the PSE chip is not always connected, and the power supply of the PSE chip is connected only when a specific condition is met, so that a power loss can be reduced and a resource waste can be avoided.

PSE specifically includes a power supply, a PSE chip, and a power supply port. The power supply provides a voltage for the PSE chip, and controls a voltage of the PSE chip by using a switch inside the PSE chip. The PSE chip continuously detects a PD by using the power supply port. When detecting a valid PD, the PSE chip outputs a voltage to the power supply port to supply power to the PD.

The voltage provided by the power supply for the PSE chip is an operating voltage stipulated in a standard, namely, a normal supply voltage, for example, 48 volts (V). The switch inside the PSE chip may be specifically a metal-oxide semiconductor field-effect transistor (MOSFET).

Even if the power supply port is idle, that is, even if the power supply port is not connected to a valid PD, the power supply always provides a 48 V voltage for the power supply port. Apparently, power is unnecessarily lost and resources are wasted.

Figure 1:
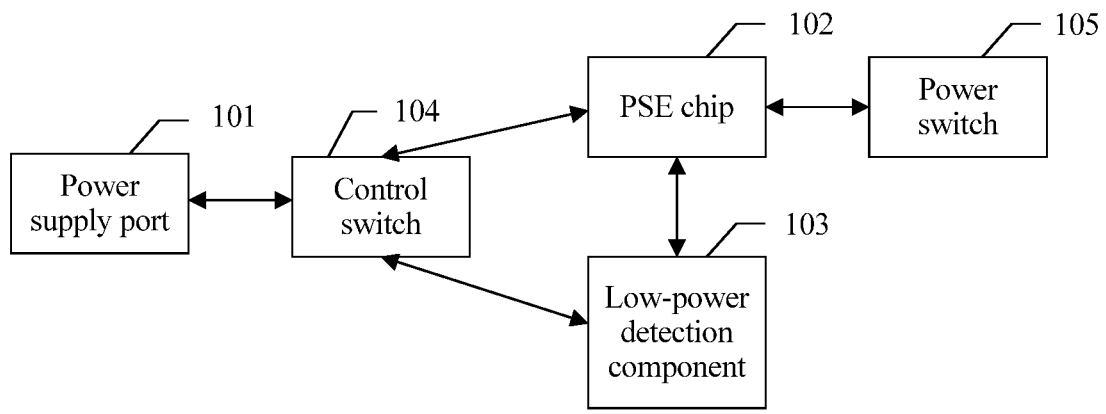
FIG. 1 is a schematic structural diagram of power sourcing equipment according to an embodiment of the present invention.

FIG. 1 is a schematic structural diagram of power sourcing equipment according to an embodiment of the present invention. The power sourcing equipment specifically includes a power supply port 101, a PSE chip 102, a low-power detection component 103, a control switch 104, and a power switch 105. The power supply port 101 is connected to the control switch 104, The PSE chip 102 and the low-power detection component 103 are separately connected to the control switch 104, and the PSE chip 102 is connected to the power switch 105. The PSE chip 102 performs related functions in a manner defined in a standard.

The low-power detection component 103 is configured to: when being connected to the power supply port 101, detect whether the power supply port 101 is connected to a valid PD. The low-power detection component 103 performs detection when operating at a low voltage.

The low voltage at which the low-power detection component 103 operates and a supply voltage output to the power supply port are independent of each other, but both come from a power management system of the power sourcing equipment. The power management system outputs a voltage based on a requirement of each component in the power sourcing equipment. In this embodiment of the present invention, a part that is in the power management system of the power sourcing equipment and that supplies power to the power supply port is referred to as a power supply.

A specific process of detecting the power supply port is as follows: Two different detection voltages are output through the power supply port 101, and an interval between the two different detection voltages is greater than or equal to 1 V. Then impedance is calculated based on values of two different detected currents and the two different detection voltages. If the impedance falls within a preset range, the power supply port 101 is determined as being connected to a valid PD. If the impedance goes beyond the preset range, the power supply port 101 is determined as not being connected to a valid PD.

When all power supply ports are idle, that is, none of the power supply ports is connected to a valid PD, the power supply port 101 keeps connected to the low-power detection component 103, the power supply port 101 keeps disconnected from the PSE chip 102, the PSE chip 102 keeps disconnected from the power supply, and the low-power detection component 103 continues to detect the power supply port 101.

When detecting that the power supply port 101 is connected to a valid PD, the low-power detection component 103 sends a first instruction. The first instruction is used to connect the PSE chip 102 to the power supply, connect the PSE chip 102 and the power supply port 101, and disconnect the low-power detection component 103 from the power supply port 101.

Specifically, the control switch 104 is configured to: according to the first instruction, connect the PSE chip 102 and the power supply port 101, and disconnect the low-power detection component 103 from the power supply port 101.

Specifically, the power switch 105 is configured to connect the PSE chip 102 to the power supply according to the first instruction.

The low-power detection component 103 can detect the power supply port 101 when operating at a low voltage.

In this embodiment of the present invention, if the low-power detection component 103 detects that the power supply port 101 is connected to a valid PD, the power supply of the PSE chip 102 is connected. In this way, a supply voltage of the PSE chip 102 is not always connected, so that a power loss can be reduced and a resource waste can be avoided.

In one embodiment, when the PSE chip 102 is connected to the power supply port 101, and the PSE chip 102 is connected to the power supply, the PSE chip 102 sends a status notification to the low-power detection component 103 when detecting that the power supply port 101 is in a non-power supplied state. The status notification is used to instruct the low-power detection component 103 to send a second instruction. The second instruction is used to instruct the control switch 104 to disconnect the PSE chip 102 from the power supply port 101, and connect the low-power detection component 103 and the power supply port 101, and instruct the power switch 105 to disconnect the PSE chip 102 from the power supply.

The control switch 104 is configured to: according to the second instruction, disconnect the PSE chip 102 from the power supply port 101, and connect the low-power detection component 103 and the power supply port 101.

The power switch 105 is configured to disconnect the PSE chip 102 from the power supply according to the second instruction.

In the foregoing technical solution, if the PD connected to the power supply port 101 is in the non-power supplied state, it indicates that no power supply needs to be provided for the PD. The power supply can be disconnected to reduce a power loss.

In one embodiment, when the PSE chip 102 is connected to the power supply port 101, and the PSE chip 102 is connected to the power supply, the PSE chip 102 may detect the power supply port 101, and output a normal supply voltage when a detection result of the power supply port 101 is that the power supply port is connected to a valid PD.

The PSE chip 102 outputs a low voltage (a detection voltage, a grading voltage, a power-on voltage, or the like) or a normal supply voltage to the power supply port 101. The power supply port 101 outputs a low voltage when the PSE chip 102 detects no valid PD, and outputs the normal supply voltage when the PSE chip 102 detects a valid PD.

The detection of the power supply port 101 is as follows: The PSE chip 102 sends a detection voltage to a PD to detect common-mode resistance in the PD.

In one embodiment, after detecting the PD, the PSE chip 102 may perform physical layer grading on the PD. Specifically, the PSE chip 102 may apply a voltage of 15 V to 20 V to the PD, and determine a grade of the PD by testing a magnitude of a current.

After the grading is completed if the grading is performed, or after the valid PD is detected if no grading is performed, the PSE starts to supply power to the PD at a low voltage in a start-up period whose duration is configurable.

In the technical solution, to ensure validity of the PD connected to the power supply port 101, the PSE chip 102 may detect the power supply port 101 again, and supply power, that is, output the normal supply voltage when a detection result is that the power supply port is connected to a valid PD.

In one embodiment, to quickly supply power to the PD, when the PSE chip 102 is connected to the power supply port 101, and the PSE chip 102 is connected to the power supply, the PSE chip 102 may directly output a normal supply voltage through the power supply port 101 without detecting the power supply port 101 again after the power supply is connected.

In one embodiment, an operating voltage of the low-power detection component 103 is greater than or equal to 10 V. In this case, it is easier to detect the power supply port 101.

In one embodiment, the low-power detection component 103 may be in the PSE chip 102.

Figure 2:
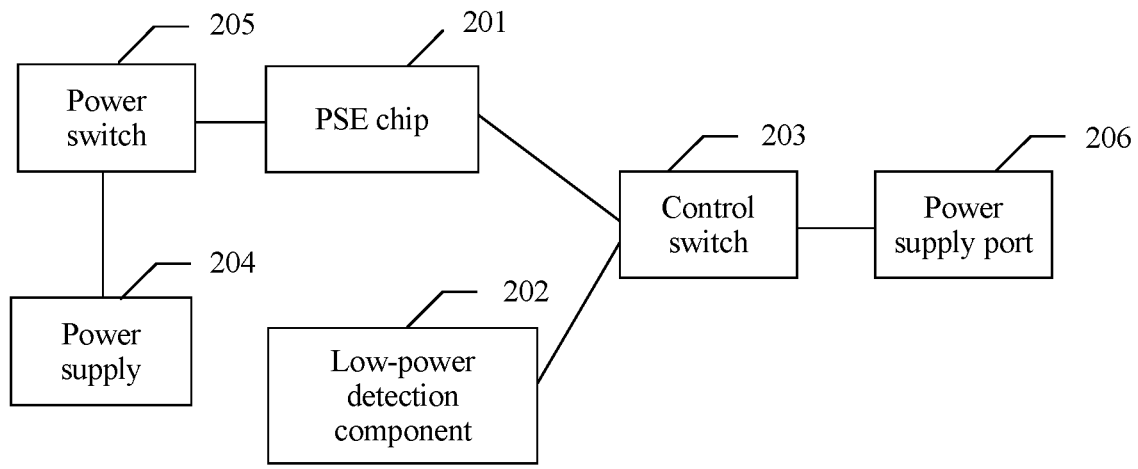
FIG. 2 is a schematic structural diagram of power sourcing equipment according to another embodiment of the present invention.

FIG. 2 is a schematic structural diagram of power sourcing equipment according to another embodiment of the present invention. A power supply 204 supplies power to a PSE chip 201 by using a power switch 205. The PSE chip 201 and a low-power detection component 202 are separately connected to a control switch 203.

Specifically, the low-power detection component 202 detects whether a power supply port 206 is connected to a valid PD. If the power supply port 206 is not connected to a valid PD, the power supply port 206 keeps connected to the low-power detection component 202, the power supply port 206 keeps disconnected from the PSE chip 201, the PSE chip 201 keeps disconnected from the power supply 204, and the low-power detection component 202 continues to detect the power supply port 206. If the power supply port 206 is connected to a valid PD, the power supply of the PSE chip 201 is connected through the power switch 205, the PSE chip 201 is connected to the power supply port 206, and the low-power detection component 202 is disconnected from the power supply port 206.

The low-power detection component 202 is located outside the PSE chip 201, and the control switch 203 and the power switch 205 are also located outside the PSE chip 201. In other words, a structure of the PSE chip does not change. The low-power detection component 202, the control switch 203, and the power switch 205 are added outside the PSE chip 201 to control an output voltage of the power supply port 206. Therefore, the output voltage of the power supply port 206 can be controlled on the basis of the PSE chip 201 without a need to alter the PSE chip 201.

In addition, the power sourcing equipment may further include a processor and a memory, and the processor, the memory, and the power supply port 206 may be connected to each other through a bus.

The processor may be one or more central processing units (CPU). When the processor is one CPU, the CPU may be a single-core CPU, or may be a multi-core CPU.

The memory may be but is not limited to one or more of a random access memory (RAM), a read-only memory (ROM), an erasable programmable read only memory (EPROM), a compact disc read-only memory (CD-ROM), and a hard disk. The memory may be further configured to store program code.

Figure 3:
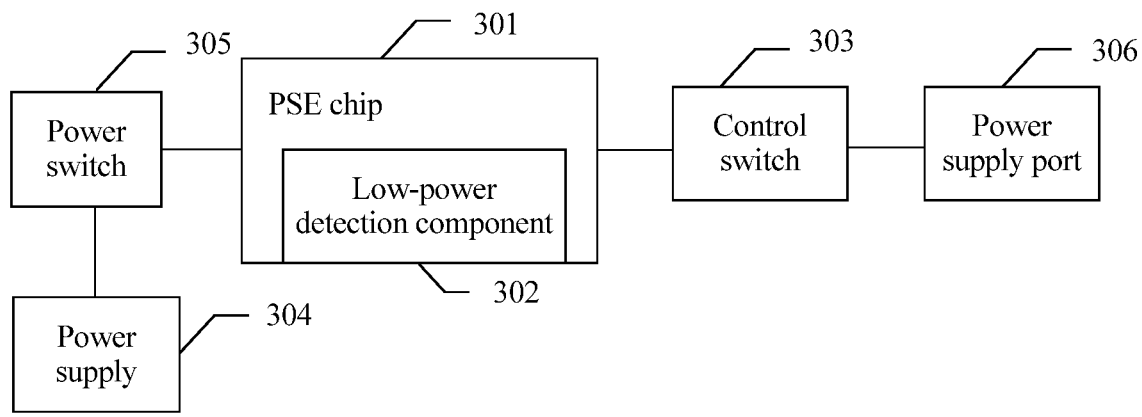
FIG. 3 is a schematic structural diagram of power sourcing equipment according to still another embodiment of the present invention.

In one embodiment, a low-power detection component may be in a PSE chip. FIG. 3 is a schematic structural diagram of power sourcing equipment according to still another embodiment of the present invention.

A power supply 304 is connected to a PSE chip 301 through a power switch 305. The PSE chip 301 and a low-power detection component 302 are separately connected to a power supply port 306 through a control switch 303.

The low-power detection component 302 is located inside the PSE chip 301. The low-power detection component 302 and the PSE chip 301 are separately connected to the power supply port 306 through different pins.

Specifically, the low-power detection component 302 detects the power supply port 306. If the power supply port 306 is not connected to a valid PD, the power supply port 306 keeps connected to the low-power detection component 302, the power supply port 306 keeps disconnected from the PSE chip 301, the PSE chip 301 keeps disconnected from the power supply 304, and the low-power detection component 302 continues to detect the power supply port 306.

The low-power detection component 302 detects the power supply port 306. If the power supply port 306 is connected to a valid PD, the power supply of the PSE chip 301 is connected by using the power switch 305, the PSE chip 301 is connected to the power supply port 306, and the low-power detection component 302 is disconnected from the power supply port 306.

The low-power detection component 302 is located inside the PSE chip 301, so that the PSE chip 301 is highly integrated. This avoids external interference, and improves reliability of detecting whether the power supply port 306 is connected to a valid PD.

In addition, the power sourcing equipment may further include a processor and a memory, and the processor, the memory, and the power supply port 306 are connected to each other through a bus.

The processor may be one or more CPUs. When the processor is one CPU, the CPU may be a single-core CPU, or may be a multi-core CPU.

The memory may be but is not limited to one or more of a RAM, a ROM, an EPROM, a CD-ROM, and a hard disk. The memory is configured to store program code.

Figure 4:
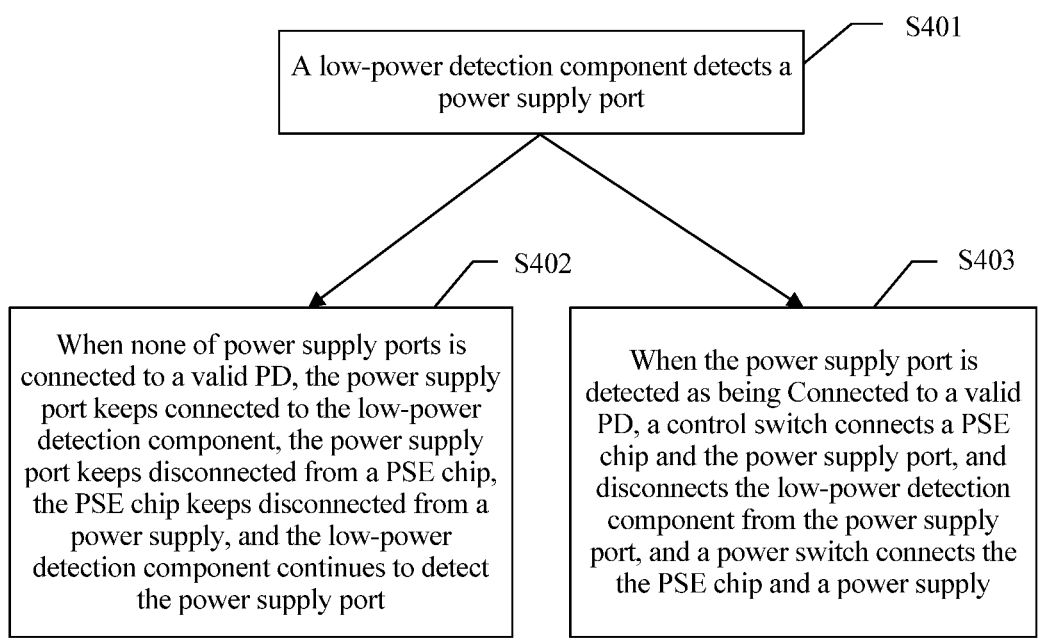
FIG. 4 is a schematic flowchart of an energy saving method for Power over Ethernet according to an embodiment of the present invention.

FIG. 4 is a schematic flowchart of an energy saving method for Power over Ethernet according to an embodiment of the present invention. The method is applied to the power sourcing equipment shown in FIG. 1 and specifically includes the following operations.

S401. A low-power detection component detects a power supply port.

First, the power supply port is connected to the low-power detection component, the power supply port is disconnected from a PSE chip, the PSE chip is disconnected from a power supply, and the low-power detection component may detect, at a low voltage, whether the power supply port is connected to a valid PD.

Specifically, two different detection voltages are output through the power supply port, and an interval between the two different detection voltages is greater than or equal to 1 V. Then impedance is calculated based on values of two different detected currents and the two different detection voltages. If the impedance falls within a preset range, the power supply port is determined as being connected to a valid PD, and S403 is performed. If the impedance goes beyond the preset range, the power supply port is determined as not being connected to a valid PD, and S402 is performed.

S402. When none of power supply ports is connected to a valid PD, the power supply port keeps connected to the low-power detection component, the power supply port keeps disconnected from a PSE chip, the PSE chip keeps disconnected from a power supply, and the low-power detection component continues to detect the power supply port.

When none of the power supply ports is connected to a valid PD, it indicates that no power needs to be supplied to the PSE chip, and only the low-power detection component needs to keep connected to the power supply port to detect whether the power supply port is connected to a valid PD.

S403. When the power supply port is detected as being connected to a valid PD, a control switch connects a PSE chip and the power supply port, and disconnects the low-power detection component from the power supply port, and a power switch connects the PSE chip and a power supply.

When the power supply port is detected as being connected to a valid PD, it indicates that power needs to be supplied to the PSE chip. In this case, the PSE chip needs to be connected to the power supply port, the low-power detection component needs to be disconnected from the power supply port, and the power supply of the PSE chip needs to be connected.

In this embodiment of the present invention, when the power supply port is detected as being connected to a valid PD, the power supply of the PSE chip is connected. In this way, a supply voltage is not always connected, so that a power loss can be reduced and a resource waste can be avoided.

In one embodiment, when the PSE chip is connected to the power supply, and the PSE chip detects that the PD connected to the power supply port is in a non-power supplied state, it indicates that no power supply needs to be provided for the PD. In this case, the PSE chip is disconnected from the power supply, the PSE chip is disconnected from the power supply port, and the low-power detection component is connected to the power supply port, so that the low-power detection component detects the power supply port.

In the foregoing technical solution, if the PD connected to the power supply port is in the non-power supplied state, it indicates that no power needs to be supplied to the PD. The power supply of the PSE chip can be disconnected to reduce a power loss.

In one embodiment, to ensure validity of the PD connected to the power supply port, the PSE chip detects the power supply port again, and outputs a normal supply voltage through the power supply port when a detection result of the power supply port is that the power supply port is connected to a valid PD.

Alternatively, the PSE chip directly outputs a normal supply voltage through the power supply port to quickly supply power to the PD.

In one embodiment, an operating voltage of the low-power detection component may be greater than or equal to 10 V. In this case, it is easier to detect the power supply port.

The parts in this specification are all described in a progressive manner. For same or similar parts in the embodiments, refer to these embodiments. Each embodiment focuses on a difference from other embodiments. Especially, the method embodiment is basically similar to the apparatus embodiments, and therefore is described in brief. For related parts, refer to descriptions in the apparatus embodiments.

What is claimed is:

1. A power sourcing equipment (PSE), comprising:
a power supply port;
a PSE chip;
a power switch, wherein the power switch is connected to the PSE chip, and is configured to connect the PSE chip to a power supply;
a low-power detection component;
a control switch, wherein the control switch is connected to the PSE chip, the low-power detection component, and the power supply port; and
wherein the low-power detection component is configured to: detect the power supply port when the low power detection component is being connected to the power supply port, and send a first instruction to the control switch in response to detecting that the power supply port is connected to a valid powered device, wherein the first instruction instructs the control switch to connect the PSE chip and the power supply port and disconnect the low-power detection component from the power supply port, and instructs the power switch to connect the PSE chip and the power supply;
wherein the PSE chip is configured to: send a status notification to the low-power detection component when detecting that the power supply port is in a non-power supplied state, wherein the status notification instructs the low-power detection component to send a second instruction to instruct the control switch to disconnect the PSE chip from the power supply port and connect the low-power detection component to the power supply port, and to instruct the power switch to disconnect the PSE chip from the power supply;
wherein the control switch is configured to: disconnect, according to the second instruction, the PSE chip from the power supply port, and connect the low-power detection component and the power supply port;
wherein the power switch is configured to disconnect the PSE chip from the power supply according to the second instruction.

2. The power sourcing equipment according to claim 1, wherein when the PSE chip is connected to the power supply port and the power supply, the PSE chip is configured to detect the power supply port, and output a normal supply voltage in response to detecting that the power supply port is connected to the valid powered device.

3. The power sourcing equipment according to claim 1, wherein when the PSE chip is connected to the power supply port and the power supply, the PSE chip is configured to directly output a normal supply voltage through the power supply port.

4. The power sourcing equipment according to claim 1, wherein an operating voltage of the low-power detection component is greater than or equal to 10 volts.

5. The power sourcing equipment according to claim 1, wherein the low-power detection component is located in the PSE chip.

6. A method for power sourcing, the method comprising:
detecting, by a low-power detection component of a power sourcing equipment (PSE), that a power supply port of the PSE is connected to a valid powered device, wherein the PSE further includes a PSE chip, a power switch, and a control switch, wherein the power switch is connected to the PSE chip and is configured to connect the PSE chip to a power supply, wherein the control switch is connected to the low-power detection component, the PSE chip, and the power supply port;
in response to detecting the power supply port is connected to the valid powered device, sending, by the low-power detection component of the PSE, a first instruction to the control switch, wherein the first instruction instructs the control switch to connect the PSE chip and the power supply port, and disconnect the low-power detection component from the power supply port, and instructs the power switch to connect the PSE chip and the power supply;
sending, by the PSE chip of the PSE, a status notification to the low-power detection component when detecting that the power supply port is in a non-power supplied state, wherein the status notification instructs the low-power detection component to send a second instruction to instruct the control switch to disconnect the PSE chip from the power supply port and connect the low-power detection component to the power supply port, and to instruct the power switch to disconnect the PSE chip from the power supply;
disconnecting, by the control switch of the PSE according to the second instruction, the PSE chip from the power supply port, and connect the low-power detection component and the power supply port; and
disconnecting the PSE chip of the PSE, from the power supply according to the second instruction.

7. The method according to claim 6, further comprising:
detecting that the power supply port is disconnected from the valid powered device, keeping the power supply port connected to the low-power detection component, the power supply port disconnected from the PSE chip, and the PSE chip disconnected from the power supply, and continuing, by the low-power detection component, to detect the power supply port.

8. The method according to claim 6, further comprising:
after the PSE chip and the power supply port are connected, disconnecting the low-power detection component from the power supply port, and connecting the PSE chip and the power supply.

9. The method according to claim 6, further comprising:
detecting, by the PSE chip, the power supply port, and outputting a normal supply voltage in response to detecting that the power supply port is connected to the valid powered device, or directly outputting, by the PSE chip, a normal supply voltage through the power supply port.

10. The method according to claim 6, wherein an operating voltage of the low-power detection component is greater than or equal to 10 volts.

11. The method according to claim 6, wherein the low-power detection component is located in the PSE chip.

12. A power supply system, comprising:
a powered device; and
a power sourcing equipment (PSE) including: a power supply port, a PSE chip, a low-power detection component, a control switch, and a power switch, wherein the power switch is connected to the PSE chip and is configured to connect the PSE chip to a power supply, wherein the control switch is connected to the PSE chip, the low-power detection component, and the power supply port;
wherein the low-power detection component is configured to: detect the power supply port when the low power detection component is being connected to the power supply port, and send a first instruction to the control switch in response to detecting that the power supply port is connected to the powered device, wherein the first instruction instructs the control switch to connect the PSE chip and the power supply port and disconnect the low-power detection component from the power supply port, and instructs the power switch to connect the PSE chip and the power supply;
wherein the PSE chip is configured to: send a status notification to the low-power detection component when detecting that the power supply port is in a non-power supplied state, wherein the status notification instructs the low-power detection component to send a second instruction to instruct the control switch to disconnect the PSE chip from the power supply port and connect the low-power detection component to the power supply port, and to instruct the power switch to disconnect the PSE chip from the power supply;
wherein the control switch is configured to: disconnect, according to the second instruction, the PSE chip from the power supply port, and connect the low-power detection component and the power supply port;
wherein the power switch is configured to disconnect the PSE chip from the power supply according to the second instruction.

13. The power supply system according to claim 12, wherein when the PSE chip is connected to the power supply port and the power supply, the PSE chip is configured to detect the power supply port, and output a normal supply voltage in response to detecting that the power supply port is connected the powered device.

14. The power supply system according to claim 12, wherein when the PSE chip is connected to the power supply port and the power supply, the PSE chip is configured to directly output a normal supply voltage through the power supply port.

15. The power supply system according to claim 12, wherein an operating voltage of the low-power detection component is greater than or equal to 10 volts.

16. The power supply system according to claim 12, wherein the low-power detection component is located in the PSE chip.

* * * * *